(12) United States Patent
Olychuck et al.

(10) Patent No.: US 11,442,943 B1
(45) Date of Patent: Sep. 13, 2022

(54) ERROR-CAUSING RECORD ISOLATION FOR DATA STREAM PROCESSING

(71) Applicant: Amazon Technologies, Inc., Seattle, WA (US)

(72) Inventors: Tyson Charles Olychuck, Seattle, WA (US); Xiaoyu Meng, Redmond, WA (US); Deepak Verma, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 17/007,778

(22) Filed: Aug. 31, 2020

(51) Int. Cl.
*G06F 16/2455* (2019.01)
*G06F 11/14* (2006.01)

(52) U.S. Cl.
CPC .... *G06F 16/24568* (2019.01); *G06F 11/1474* (2013.01); *G06F 2201/82* (2013.01)

(58) Field of Classification Search
CPC ............. G06F 11/1474; G06F 2201/82; G06F 16/24568
See application file for complete search history.

(56) References Cited

U.S. PATENT DOCUMENTS

2011/0314019 A1* 12/2011 Jimenez Peris ....... G06F 9/5066
707/774

OTHER PUBLICATIONS

Lopez et al., "A Performance Comparison of Open-Source Stream Processing Platforms", 2016, IEEE (Year: 2016).*
Smith, Benjamin, "New AWS Lambda controls for stream processing and asynchronous invocations", AWS Compute Blog, Nov. 25, 2019 (Year: 2019).*
"AWS Lambda Supports Failure-Handling Features for Kinesis and DynamoDB Event Sources", Nov. 25, 2019, https://aws.amazon.com/about-aws/whats-new/2019/11/aws-lambda-supports-failure-handling-features-for-kinesis-and-dynamodb-event-sources/ (Year: 2019).*
AWS Lambda Developer Guide, updated 2022, pp. 1 and 581-601 (Year: 2022).*

* cited by examiner

*Primary Examiner* — Michael Maskulinski
(74) *Attorney, Agent, or Firm* — BakerHostetler

(57) ABSTRACT

A first group processing attempt may be performed on a first record group in a stream of ordered data records. The first group processing attempt may fail, and the first record group may be split into at least a second record group and a third record group. A second group processing attempt may be performed on the second record group, and a third group processing attempt may be performed on the third record group. For the second, the third and following record groups, each record group that is not processed successfully may be split into two or more other record groups and additional group processing attempts may be performed on the two or more other record groups until the error-causing record is isolated as a single record. Processing of the error-causing record may be bypassed after it is isolated as a single record.

20 Claims, 13 Drawing Sheets

User Interface 160

☒ 161 Split Record Group on Failure

| 2 | 162 Number of Groups

| Destination XYZ | 163 On Failure Destination

| 1 | 164 Maximum Retry Attempts

| 200 | 165 Maximum Record Age (in seconds)

FIG. 3

ERROR-CAUSING RECORD ISOLATION FOR DATA STREAM PROCESSING

BACKGROUND

Data stream processing may include processing of a data stream that includes multiple ordered records. Records in a data stream may be assigned various values to indicate their order, such as partition keys and sequence numbers. Records in a data stream may be ordered and processed such that a given group of records that is currently being processed may be required to be older than a subsequent group of records that has not yet been processed. In some cases, when an error occurs during processing of a record within a given record group, the processing of the entire record group may be repeatedly re-attempted, for example until the error is either resolved or the data expires. This may result in a high quantity of re-attempts, thereby delaying processing of subsequent record groups. This may also be problematic because the data may expire before the record group can be successfully processed Thus, when a record group includes even a single error-causing record, the processing of the entire record group may be delayed and/or may never be successfully completed. For these reasons, an error-causing record may sometimes be referred to as a poison-pill.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 3 is a diagram illustrating a second example user interface configuration in accordance with the present disclosure.

DETAILED DESCRIPTION

Figure 1:
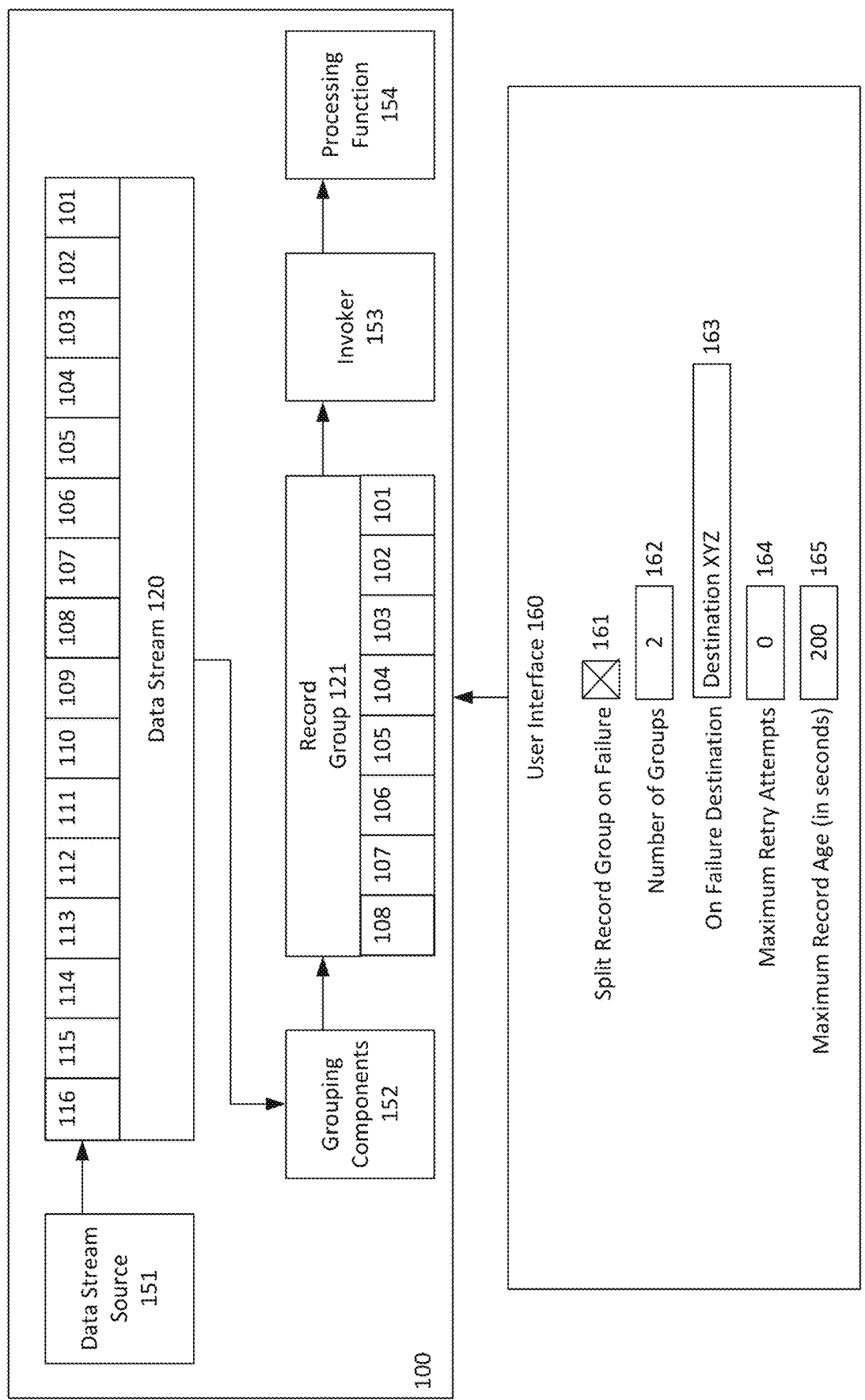
FIG. 1 is a diagram illustrating an example data stream processing system and first example user interface configuration that may be used in accordance with the present disclosure.

Techniques for error-causing record isolation for data stream processing are described herein. The techniques described herein may include processing of a data stream that includes multiple ordered records. Records in a data stream may be assigned various values to indicate their order, such as partition keys and sequence numbers. Records in a data stream may be ordered and processed such that a given group of records that is currently being processed may be required to be older than a subsequent group of records that has not yet been processed. In some examples, various user-selectable and user-configurable features may be provided to assist with data stream processing efficiency. In some examples, these features may include a group-split feature, a maximum number of retry attempts feature, a maximum record age feature, an on-failure destination configuration feature, and others.

In some examples, a group-split feature may be provided that allows a given record group to be split into two or more smaller record groups when an error occurs during record processing. An interface may be provided to allow a user to optionally enable or disable this feature. As an example, in some cases, when an error occurs during processing of a first record group, the first record group may be split into a second record group and a third record group. In some examples, when a record group is split, it may be bisected such that it is split into two new record groups having an equal (or approximately equal) number of records. In other examples, a single record group may be split into more than two new record groups. After a record group is split, the processing of the new record groups may be attempted. The new (and following) record groups may continue to be split if an error occurs during one of the record processing attempts. For example, a first record group may be split into second and third record groups. Processing of the second record group may be attempted and may be successful (e.g., no errors). However, processing of the third record group may be attempted and may result in an error. The third record group may then be split into a fourth, a fifth and optionally other record groups. Record groups with failed processing attempts may continue to be split until an error-causing (poison-pill) record is isolated as the only record in a record group. Processing of the isolated error-causing record may then be bypassed. Additionally, an on-failure destination configuration feature may be provided that allows metadata associated with the error-causing record to optionally be sent to a user-selected destination (e.g., a simple queue service (SQS), etc.).

Splitting of record groups in this manner may provide a number of advantages. For example, as described above, in some conventional techniques, when an error occurs during processing of a record within a given record group, the processing of the entire record group may be repeatedly re-attempted, for example until the error is either resolved or the data expires. This may result in a high quantity of re-attempts, thereby delaying processing of subsequent record groups. This may also be problematic because the data may expire before the record group can be successfully processed. In contrast to these conventional techniques, the techniques described herein may allow a record group to be split when the record group includes an error-causing message. This allows an error-causing (poison-pill) message to be eventually isolated as the only record in a record group. By isolating the error-causing record, other records that do not cause errors may be successfully processed, thereby potentially reducing both processing delays and quantities of unprocessed records.

Moreover, it is noted that the splitting techniques described herein may also be advantageous because they may allow an error-causing record to be identified and eventually isolated even without knowledge of which specific record in a record group causes a record group processing operation to fail. For example, when processing fails for a first record group that includes multiple records, it may sometimes be difficult to determine which of the multiple records is the error-causing record that resulted in the failure. This data may sometimes be unknown or may not be easily accessible to certain processing components. The group splitting techniques described herein may alleviate this problem by allowing the error-causing record to be identified and eventually isolated even without knowledge of which specific record in the first record group caused the processing of the first record group to fail.

A maximum number of retry attempts feature is another feature that may be provided to assist with data stream processing efficiency. An interface may be provided to a allow a user to enable this feature and/or to select the maximum number of retry attempts. In some examples, a default number may be used unless modified by the user. Specifically, this feature may allow a user to specify a maximum number of times that processing of a record group will be reattempted (after a failure) before the record group is either split (if the group-split feature is enabled) or bypassed. A maximum record age feature is yet another feature that may be provided to assist with data stream processing efficiency. An interface may be provided to allow a user to enable this feature and/or to select the maximum record age (e.g., in seconds). Specifically, when a record is not successfully processed prior within the maximum record age, then processing of the record may be bypassed. In some cases, both the maximum number of retry attempts and the maximum record age may be enabled and used in combination with one another in order to avoid backlogs and processing delays. It is noted that the selections of the maximum retry attempts and the maximum record age may involve certain trade-offs that the user may specially tailor in order to meet their individual priorities. For example, in some cases, setting a lower number of retry attempts and/or a lower maximum record age may lower the possibility of record processing delays. However, a user may sometimes wish to balance this against the possibility of bypassing records before they can be successfully processed.

Referring now to FIG. 1, an example data stream processing system 100 will now be described in detail. As shown, data stream processing system 100 includes a data stream source 151 that generates a data stream 120. A data stream, as that term is used herein, refers to a stream of ordered data records. In this example, data stream 120 includes records 101-116. Records in a data stream may be assigned various values to indicate their order, such as partition keys and sequence numbers. For example, a sequence number may be unique within a given partition key and may be used to indicate a relative order of records within the given partition key. Put another way, if two or more records have the same partition key, then their sequence numbers may be used to determine their relative order. By contrast, if two or more records have different partition keys, then their sequence numbers alone do not necessarily reflect their relative order. For purposes of ease of description of the concepts herein, it may be assumed that records 101-116 all have the same partition key and that their indicated record numbers (i.e., records 101-116) are identical to their sequence numbers. Thus, record 101 is older than record 102, record 102 is older than record 103, record 103 is older than record 104, and so forth.

Grouping components 152, sometimes referred to as a batcher, may group the data stream 120 into various record groups, sometimes referred to as batches. In the example of FIG. 1, grouping components 152 have grouped records 101-108 into a record group 121. Although not shown in FIG. 1, grouping components 152 may subsequently group the remaining records 109-116 into one or more other record groups. In some examples, records may be initially grouped into a record group based on various limits, such as a limit on an amount of data (e.g., a limit of 6 megabits) that may be included in a record group, a limit on a quantity of records that may be included in a record group, and a limit on an amount of time for creating a record group. In some examples, the grouping components 152 may create a record group by continuing to add records to the record group until one of these limits is met or exceeded, which may cause the grouping components to then start adding records to a subsequent record group.

Invoker 153 may request and retrieve record groups from the grouping components 152. Invoker 153 may also invoke processing function 154 for processing of each retrieved record group. In some examples, processing function 154 may be a serverless processing function that may run code without provisioning or managing of servers. The processing function 154 may, for example, run code only when needed and scale automatically. This may be advantageous to customers of the processing function 154, for example by allowing the customers to be charged only for consumed computing time and to not be charged for time when code is not running.

As also shown in FIG. 1, a user interface 160 may be provided, for example by a service that may host execution of the data stream processing system 100. The user interface 160 may allow a customer of the service to select and configure various features that may be employed to control the processing of the data stream 120. In the example of FIG. 1, these features may a group-split feature, a number of groups feature, a maximum number of retry attempts feature, a maximum record age feature, an on-failure destination configuration feature, and others. Specifically, the user interface 160 includes a checkbox 161 the is used to enable (and disable) the group-split feature. In the example of FIG. 1, checkbox 161 is activated (as shown by the "X" within the checkbox 161) in order to enable the group-split feature. As will be described in detail below, the group-split feature allows a record group to be split into two or more smaller record groups when a failure occurs due to an error in processing of one or more of the records within the record group. User interface 160 also includes input fields 162-165. Specifically, input field 162 allows a user to specify how many new groups a record group will be split into when a failure occurs. In the example of FIG. 1, input field 162 indicates that a record group will be split into two new groups. For the on-failure destination configuration feature, input field 163 allows a user to specify a destination to which to send metadata associated with an error-causing record. In the example of FIG. 1, input field 163 indicates that the metadata will be sent to Destination XYZ. For the maximum number of retry attempts feature, input field 164 allows a user to specify a maximum number of times that a processing of a record group can be retried after an occurrence of an error. In the example of FIG. 1, input field 164 indicates that zero retires are permitted. For the maximum record age feature, input field 165 allows a user to specify a maximum record age (e.g., in seconds) before a record is expired and its processing is bypassed. In the example of FIG. 1, input field 165 indicates that the maximum record age is 200 seconds.

It is noted that, in some examples, the group-split feature, the number of groups feature, the maximum number of retry attempts feature, the maximum record age feature, the on-failure destination configuration feature, and/or other features may sometimes be set to one or more default values, and these default values may sometimes be employed unless modified by a user. It is also noted that, while these and other features are described herein as being user-selectable and/or user-configurable features, the techniques described herein may also be employed in scenarios in which these features are not user-selectable and/or user-configurable features, such as scenarios in which values are automatically selected by a computing service on behalf of the user. For example, in some cases, a computing service may automatically select, configure, modify, enable and/or disable any of the above described features, for example based on factors such as observed delays in processing of records and the like. In some examples, user-selected configurations may be modified or overridden by one or more computing components. By contrast, in other examples, computer-selected configurations may be modified or overridden by a user.

Figure 2:
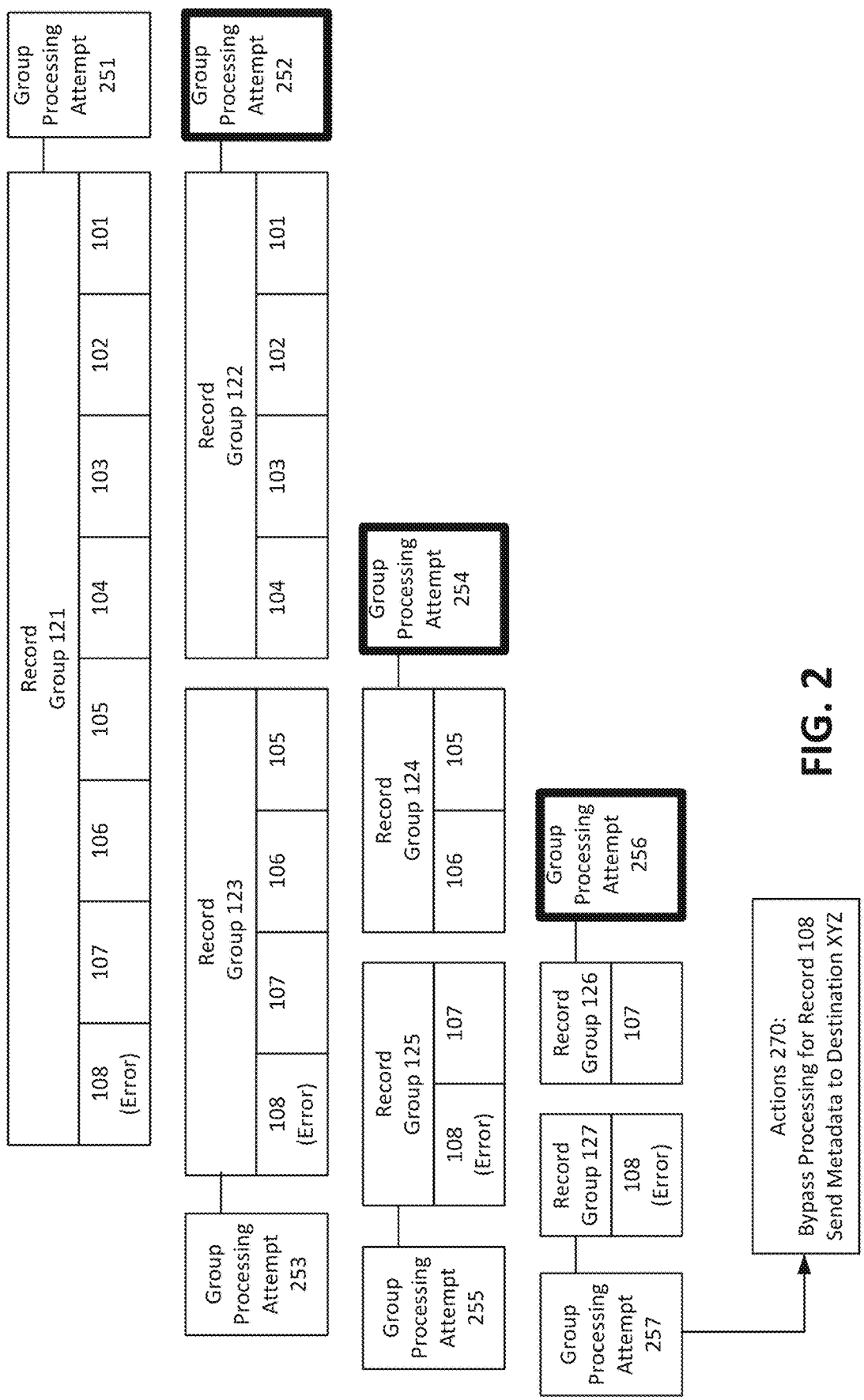
FIG. 2 is a diagram illustrating example record group processing based on the first example user interface configuration in accordance with the present disclosure.

Referring now to FIG. 2, example record group processing based on the example user interface configuration of FIG. 1 will now be described in detail. As shown in FIG. 2, a group processing attempt 251 is performed on record group 121, for example by invoking processing function 154 of FIG. 1. A group processing attempt, as that term is used herein, is an attempt to process a group of one or more records. A group processing attempt may either be a failure or a success. A group processing attempt may succeed when all records in the record group are processed by the group processing attempt. A group processing attempt may fail when an error occurs during processing of one or more records in the record group. In the example of FIG. 2, during the performance of group processing attempt 251, records 101-107 are processed successfully with no errors. However, an error occurs during processing of record 108 (as indicated by the word "Error" included in record 108 of FIG. 2). Thus, group processing attempt 251 fails due to the error that occurs during processing of record 108.

As described above, in some conventional techniques, when an error occurs during processing of a record within a given record group, the processing of the entire record group may be repeatedly re-attempted, for example until the error is either resolved or the data expires. This may result in a high quantity of re-attempts, thereby delaying processing of subsequent record groups (e.g., including records 109-116 of FIG. 1). This may also be problematic because the data may expire before the record group can be successfully processed.

However, in contrast to these conventional techniques, FIG. 1 shows that the group-split feature has been enabled (as indicated by the activation of checkbox 161 of FIG. 1). As also shown in FIG. 1, the number of new groups into which to split the record group is set to two (as indicated by the two shown in input field 162 of FIG. 1). As also shown in FIG. 1, the maximum retry attempts is set to zero (as indicated by the zero shown in input field 164 of FIG. 1). This means that, when a group processing attempt fails on a record group, the record group will be split into two new groups (with no retries of the prior record group). This is shown in FIG. 2 by splitting record group 121 into record group 122 (including records 101-104) and record group 123 (including records 105-108).

As shown in FIG. 2, a group processing attempt 252 may be performed on record group 122, for example by invoking processing function 154 of FIG. 1. There are no errors in processing records 101-104. Thus, group processing attempt 252 is successful, as indicated in FIG. 2 by the thick bold outline surrounding group processing attempt 252. As also shown in FIG. 2, a group processing attempt 253 may be performed on record group 123, for example by invoking processing function 154 of FIG. 1. There are no errors in processing records 105-107. However, an error again occurs during processing of record 108. Thus, group processing attempt 253 fails due to the error that occurs during processing of record 108.

Based on the settings of user interface 160 of FIG. 1, record group 123 is split into record group 124 (including records 105 and 106) and record group 125 (including records 107 and 108). A group processing attempt 254 may be performed on record group 124, for example by invoking processing function 154 of FIG. 1. There are no errors in processing records 105 and 106. Thus, group processing attempt 254 is successful, as indicated in FIG. 2 by the thick bold outline surrounding group processing attempt 254. As also shown in FIG. 2, a group processing attempt 255 may be performed on record group 125, for example by invoking processing function 154 of FIG. 1. There are no errors in processing record 107. However, an error again occurs during processing of record 108. Thus, group processing attempt 255 fails due to the error that occurs during processing of record 108.

Based on the settings of user interface 160 of FIG. 1, record group 125 is split into record group 126 (including record 107) and record group 127 (including record 108). A group processing attempt 256 may be performed on record group 126, for example by invoking processing function 154 of FIG. 1. There are no errors in processing records 107. Thus, group processing attempt 256 is successful, as indicated in FIG. 2 by the thick bold outline surrounding group processing attempt 256. As also shown in FIG. 2, a group processing attempt 257 may be performed on record group 127, for example by invoking processing function 154 of FIG. 1. An error again occurs during processing of record 108. Thus, group processing attempt 255 fails due to the error that occurs during processing of record 108. However, because record group 127 includes only a single record (record 108), it is determined that record 108 is an error-causing record that has been isolated in record group 127. Thus, the processing of record 108 is bypassed. As shown, in FIG. 2, actions box 270 indicates that the processing of record 108 is bypassed upon failure of group processing attempt 257. Referring back to FIG. 1, the user has specified, via input field 163, that metadata for an error-causing records should be sent to Destination XYZ. Thus, as also shown in actions box 270, upon failure of group processing attempt 257, metadata for record 108 is sent to Destination XYZ.

In some examples, the processing of data stream 120 may be distributed across multiple shards, which may operate in parallel to process the data stream 120. Also, in some examples, in order to ensure that records are processed in order, each record partition key may be mapped to a specific shard for processing. In some cases, the processing of record group 121 (as well as smaller record groups 122-127) may be performed by a single shard. As record groups 121-127 are processed by this single shard, other records may simultaneously be processed by other shards. One advantage of this technique is that a processing delay that occurs on a given shard need not necessarily impact or cause delays to other shards. Thus, when a given shard attempts to isolate a poison-pill record, the time that is required to split a record group (and re-attempt processing on smaller record groups) may not cause delays to the processing of other shards.

In the examples of FIGS. 1-2, the user has set the maximum number of retry attempts to zero. Thus, when a group processing attempt fails (as in the case of group processing attempts 251, 253, 255 and 257), the attempt is not retried. However, the techniques disclosed herein may allow a user to configure the system to allow one or more retry attempts. Referring now to FIG. 3, user interface 160 is again shown. However, user interface 160 of FIG. 3 differs from user interface 160 of FIG. 1 in that the input field 164 has been modified from a value of zero (as in FIG. 1) to a value of one. This results in the maximum number of retry attempts being set to one. Thus, in the configuration of FIG. 3, when a group processing attempt fails, the group processing attempt may be retried one time. In some examples, when a group processing attempt is retried, an error that had previously resulted in a failed attempt may be resolved, and the previously failed record processing attempt may be successful when it is reattempted. Thus, users may sometimes wish to allow a certain number of retry attempts. However, allowing too many retry attempts may result in processing delays and/or may cause data to expire.

Figure 4A:
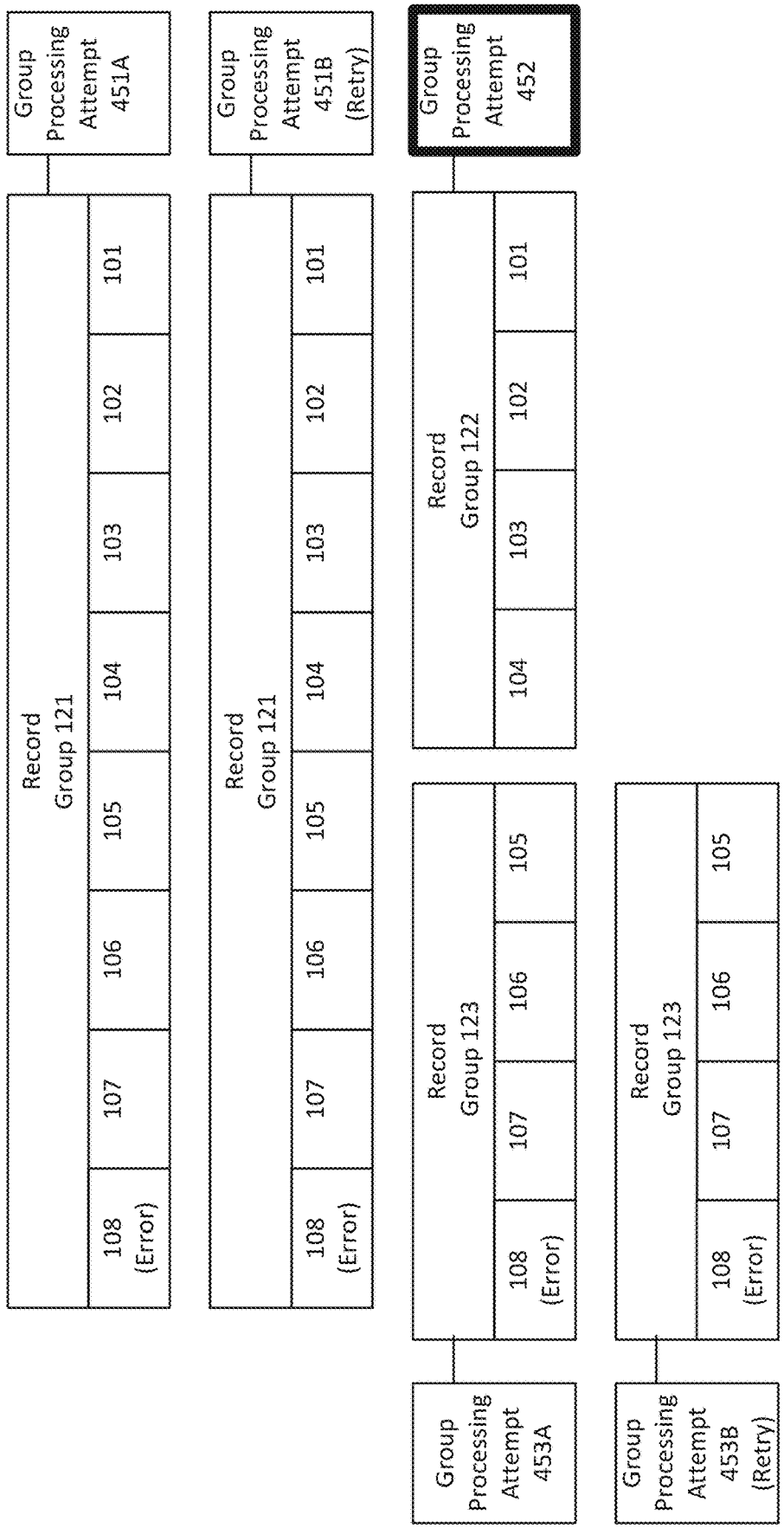
FIGS. 4A and 4B are diagrams illustrating example record group processing based on the second example user interface configuration that may be used in accordance with the present disclosure.
Figure 4B:
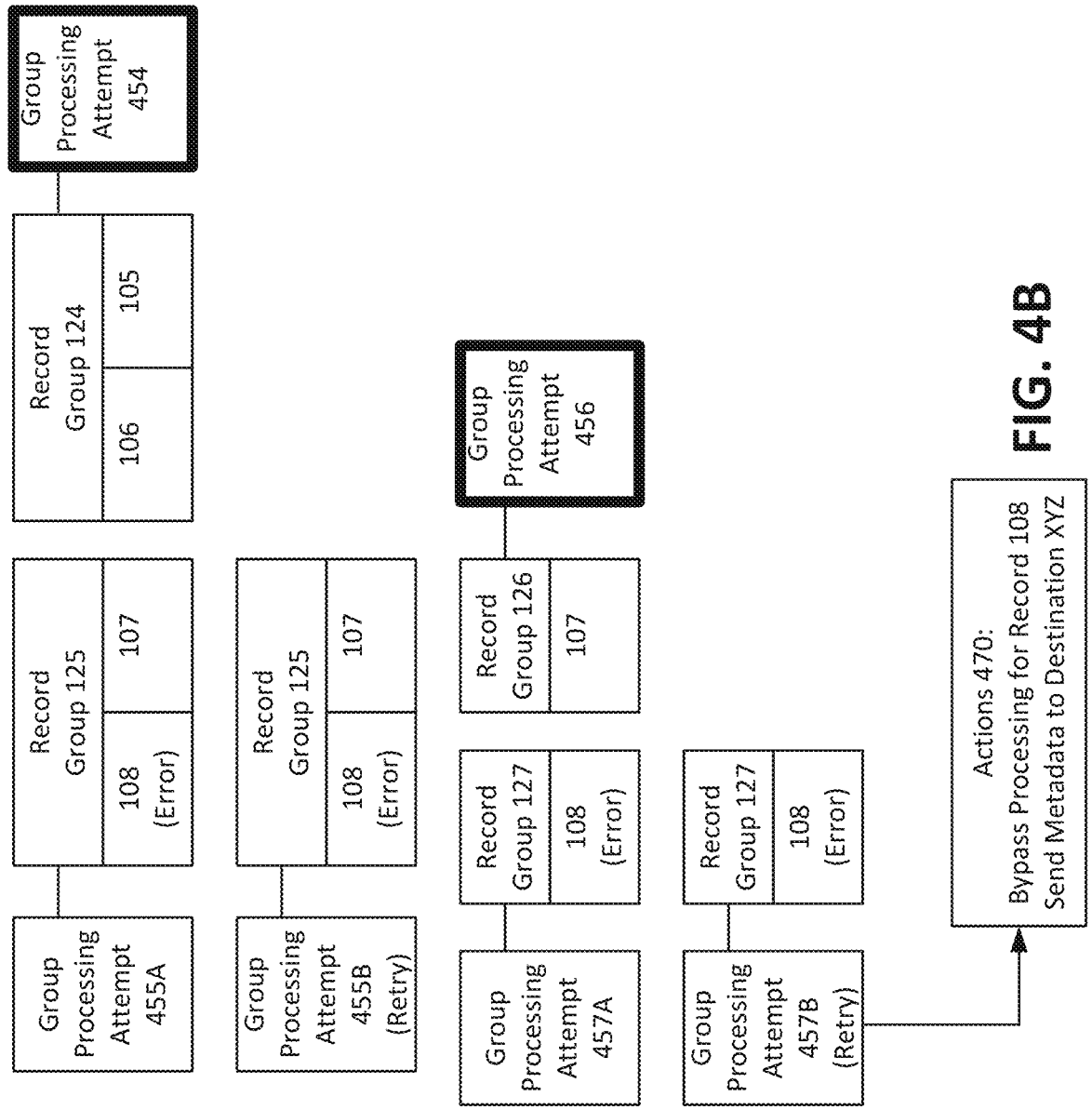

Referring now to FIGS. 4A-4B, example record group processing based on the example user interface configuration of FIG. 3 will now be described in detail. As shown in FIG. 4A, a group processing attempt 451A is performed on record group 121. In the example of FIG. 4A, during the performance of group processing attempt 451A, records 101-107 are processed successfully with no errors. However, an error occurs during processing of record 108 (as indicated by the word "Error" included in record 108 of FIG. 4A). Thus, group processing attempt 451A fails due to the error that occurs during processing of record 108. However, unlike group processing attempt 251 of FIG. 2, group processing attempt 451A of FIG. 4A may be retried. Accordingly, as shown in FIG. 4A, group processing attempt 451B, which is a retry of group processing attempt 451A, is executed on record group 121, which is the same record group upon which group processing attempt 451A was executed. During the performance of group processing attempt 451B, records 101-107 are processed successfully with no errors. However, an error again occurs during processing of record 108. Thus, group processing attempt 451B fails due to the error that occurs during processing of record 108. This time, because the system has been configured to perform a maximum of one retry attempt, the processing of record group 121 cannot be retried. Accordingly, because the group-split feature has been enabled by activation of checkbox 161 in FIG. 3, the failure of group processing attempt 451B results in record group 121 being split into record group 122 (including records 101-104) and record group 123 (including records 105-108).

As shown in FIG. 4A, a group processing operation 452 is successfully performed on record group 122 by processing records 101-104 with no errors. Additionally, a group processing attempt 453A is performed on record group 123. During the performance of group processing attempt 453A, records 105-107 are processed successfully with no errors. However, an error occurs during processing of record 108. Thus, group processing attempt 453A fails due to the error that occurs during processing of record 108. Accordingly, group processing attempt 453B, which is a retry of group processing attempt 453A, is executed on record group 123. During the performance of group processing attempt 453B, records 105-107 are processed successfully with no errors. However, an error again occurs during processing of record 108. Thus, group processing attempt 453B fails due to the error that occurs during processing of record 108. Because the system has been configured to perform a maximum of one retry attempt, the processing of record group 123 cannot be retried. Accordingly, referring now to FIG. 4B, it is shown that the failure of group processing attempt 453B results in record group 123 being split into record group 124 (including records 105 and 106) and record group 125 (including records 107 and 108).

As shown in FIG. 4B, a group processing operation 454 is successfully performed on record group 124 by processing records 105 and 106 with no errors. Additionally, a group processing attempt 455A is performed on record group 125. During the performance of group processing attempt 455A, record 107 is processed successfully with no errors. However, an error occurs during processing of record 108. Thus, group processing attempt 455A fails due to the error that occurs during processing of record 108. Accordingly, group processing attempt 455B, which is a retry of group processing attempt 455A, is executed on record group 125. During the performance of group processing attempt 455B, record 107 is processed successfully with no errors. However, an error again occurs during processing of record 108. Thus, group processing attempt 455B fails due to the error that occurs during processing of record 108. Because the system has been configured to perform a maximum of one retry attempt, the processing of record group 125 cannot be retried. Accordingly, the failure of group processing attempt 455B results in record group 125 being split into record group 126 (including record 107) and record group 127 (including record 108).

A group processing operation 456 is successfully performed on record group 126 by processing record 107 with no errors. Additionally, a group processing attempt 457A is performed on record group 127. During the performance of group processing attempt 457A, an error occurs during processing of record 108. Thus, group processing attempt 457A fails due to the error that occurs during processing of record 108. Accordingly, group processing attempt 457B, which is a retry of group processing attempt 457A, is performed on record group 127. During group processing attempt 457B, an error again occurs during processing of record 108. Thus, group processing attempt 457B fails due to the error that occurs during processing of record 108. Because the system has been configured to perform a maximum of one retry attempt, the processing of record group 127 cannot be retried. Accordingly, because record group 127 includes only a single record (record 108), it is determined that record 108 is an error-causing record that has been isolated in record group 127. Thus, the processing of record 108 is bypassed. As shown, actions box 470 indicates that the processing of record 108 is bypassed upon failure of group processing attempt 457B. Additionally, metadata for record 108 is sent to Destination XYZ based on Destination XYZ being identified in input field 163 of FIG. 3.

Figure 5:
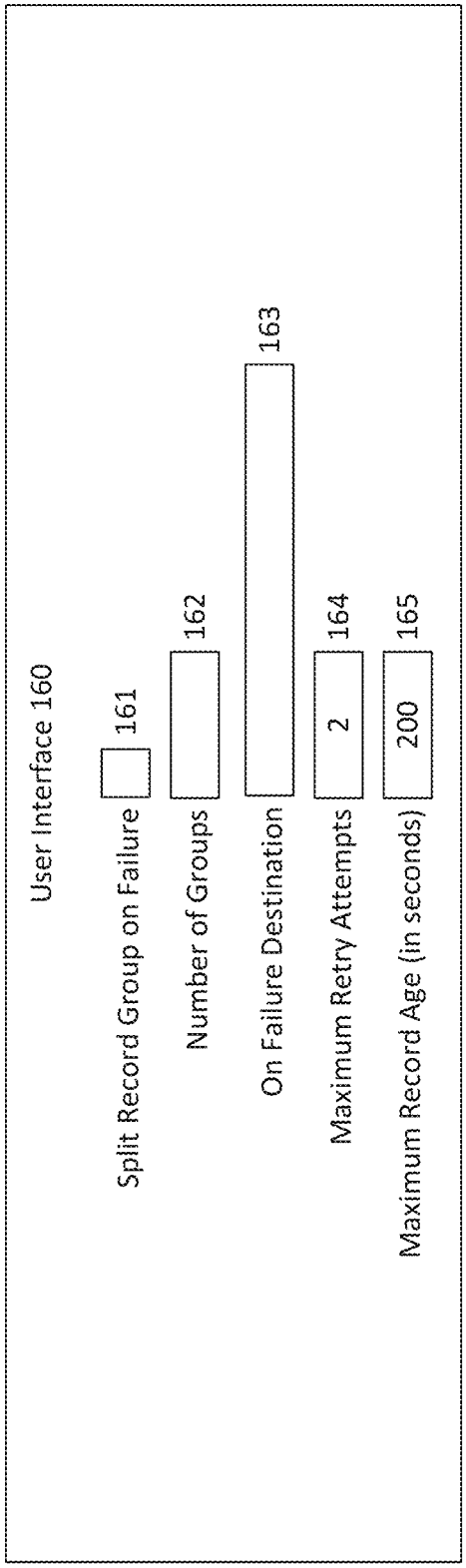
FIG. 5 is a diagram illustrating a third example user interface configuration that may be used in accordance with the present disclosure.
Figure 6:
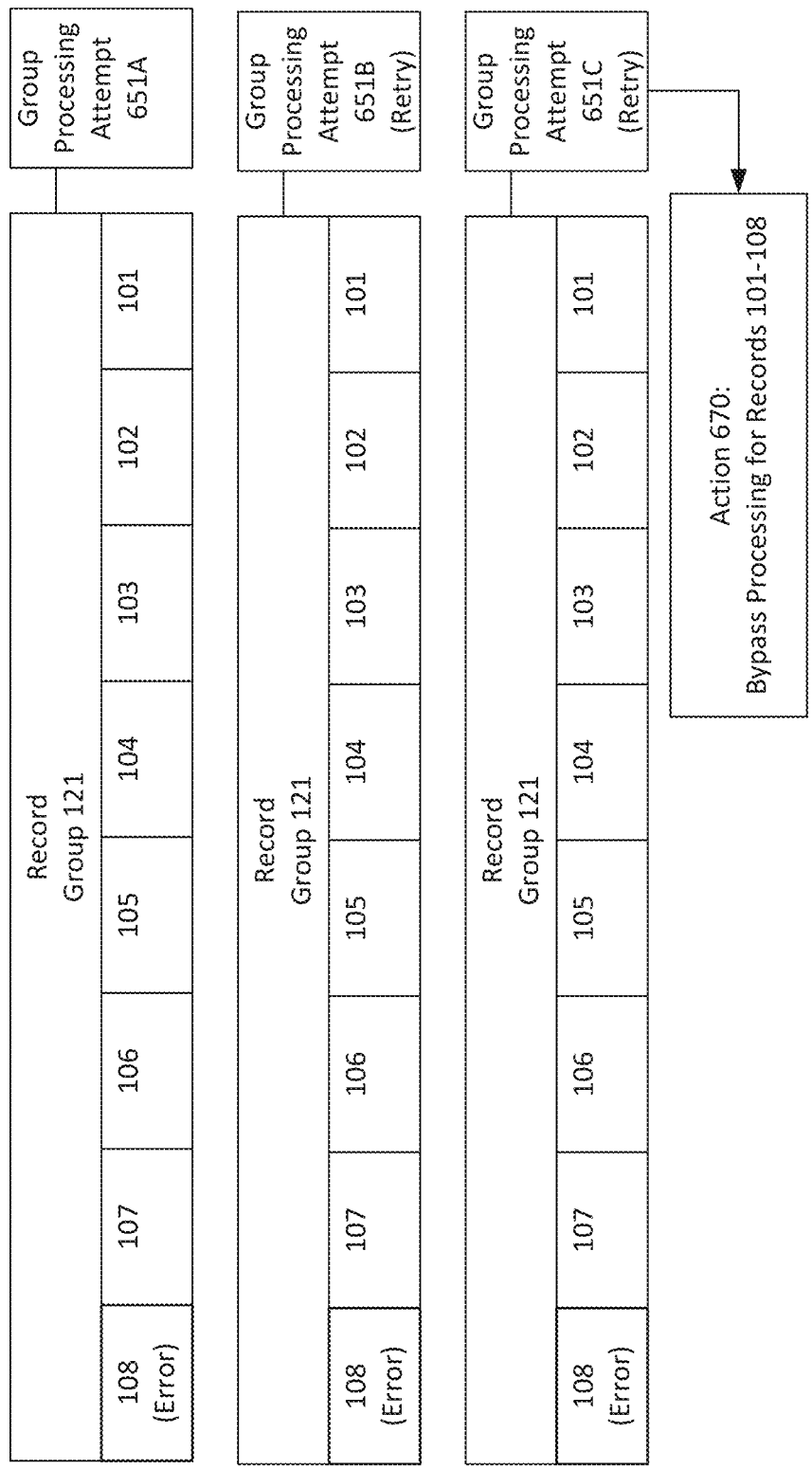
FIG. 6 is a diagram illustrating example record group processing for an unresolved error based on the third example user interface configuration that may be used in accordance with the present disclosure.

The preceding description includes examples in which the group-split feature is enabled, for example based on the activation of checkbox 161 FIGS. 1 and 3. In some cases, however, a user may choose to disable the group-split feature. For example, referring now to FIG. 5, the checkbox 161 of user interface 160 may not be activated/checked, thereby disabling the group-split feature. As also shown in FIG. 5, the maximum retry attempts have been set to two via input field 164. Referring now to FIG. 6, example record group processing based on the example user interface configuration of FIG. 5 will now be described in detail. As shown in FIG. 6, a group processing attempt 651A is performed on record group 121. In the example of FIG. 6, during the performance of group processing attempt 651A, records 101-107 are processed successfully with no errors. However, an error occurs during processing of record 108 (as indicated by the word "Error" included in record 108 of FIG. 6). Thus, group processing attempt 751A fails due to the error that occurs during processing of record 108. However, because maximum retry attempts are set to two, group processing attempt 651A may be retried up to two times. Accordingly, as shown in FIG. 6, group processing attempt 651B, which is a first retry of group processing attempt 651A, is executed on record group 121. During the performance of group processing attempt 651B, records 101-107 are processed successfully with no errors. However, an error again occurs during processing of record 108. Thus, group processing attempt 651B fails due to the error that occurs during processing of record 108. Group processing attempt 651C, which is a second retry of group processing attempt 651A, is then executed on record group 121. During the performance of group processing attempt 651C, records 101-107 are processed successfully with no errors. However, an error again occurs during processing of record 108. Thus, group processing attempt 651C fails due to the error that occurs during processing of record 108. This time, because the system has been configured to perform a maximum of two retry attempts, the processing of record group 121 cannot be retried. Additionally, because the group-split feature has been disabled, the failure of group processing attempt 451B results in record processing of records 101-108 being bypassed (as shown in actions box 670).

Figure 7:
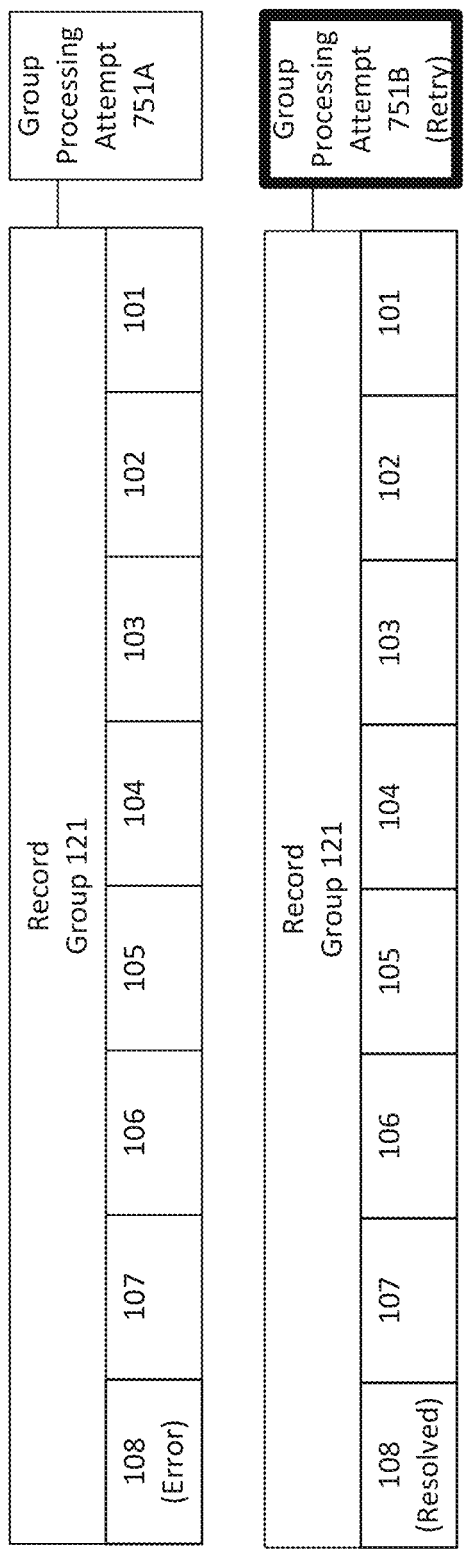
FIG. 7 is a diagram illustrating example record group processing for a resolved error based on the third example user interface configuration that may be used in accordance with the present disclosure.

In the prior examples of FIGS. 2, 4A-4B and 6, the error that occurs during processing of record 108 is never resolved. In some cases, however, an error that occurs during an initial processing attempt of a record may sometimes be resolved, and the record may eventually be processed successfully. Referring now to FIG. 7, an example of an error resolution on a retry attempt will now be described. In FIG. 7, record processing is once again performed based on the configuration of user interface 160 in FIG. 5. As shown in FIG. 7, a group processing attempt 751A is performed on record group 121. In the example of FIG. 7, during the performance of group processing attempt 751A, records 101-107 are processed successfully with no errors. However, an error occurs during processing of record 107 (as indicated by the word "Error" included in record 108 for group processing attempt 751A). Thus, group processing attempt 751A fails due to the error that occurs during processing of record 108. However, because maximum retry attempts are set to two, group processing attempt 751A may be retried up to two times. Accordingly, as shown in FIG. 7, group processing attempt 751B, which is a retry of group processing attempt 751A, is executed on record group 121. During the performance of group processing attempt 651B, records 101-107 are processed successfully with no errors. Additionally, this time, record 108 is also processed successfully with no errors. Thus, in the example of FIG. 7, the error that formerly occurred during the initial processing of record 108 is resolved (as indicated by the word "Resolved" included in record 108 for group processing attempt 751B). Thus, record group processing attempt 751B is successful.

Figure 8:
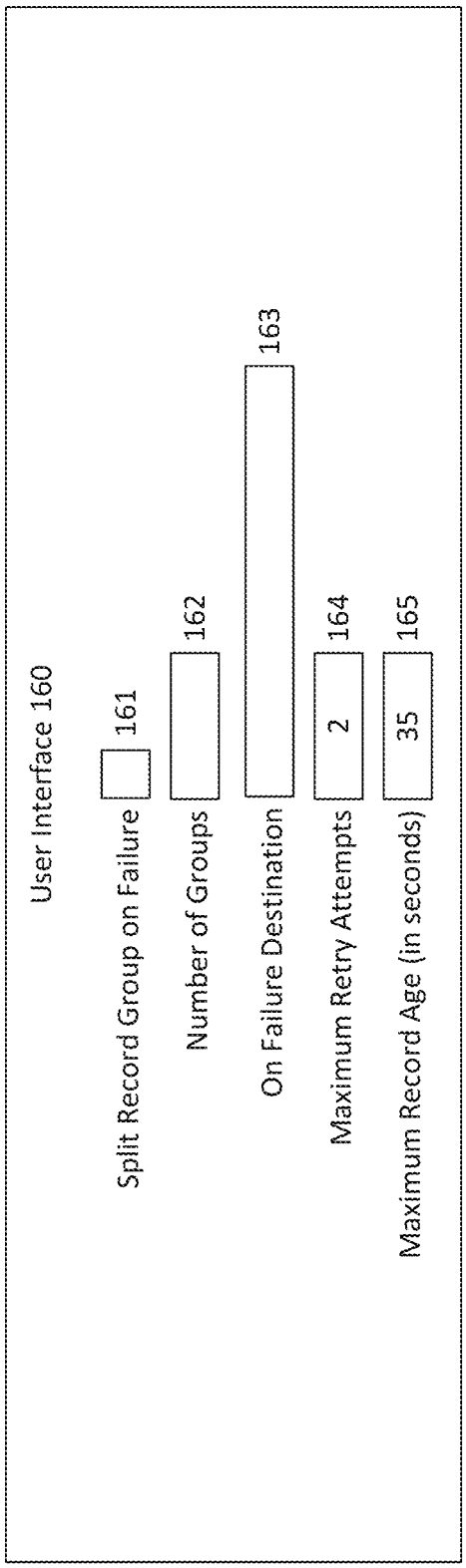
FIG. 8 is a diagram illustrating a fourth example user interface configuration that may be used in accordance with the present disclosure.
Figure 9:
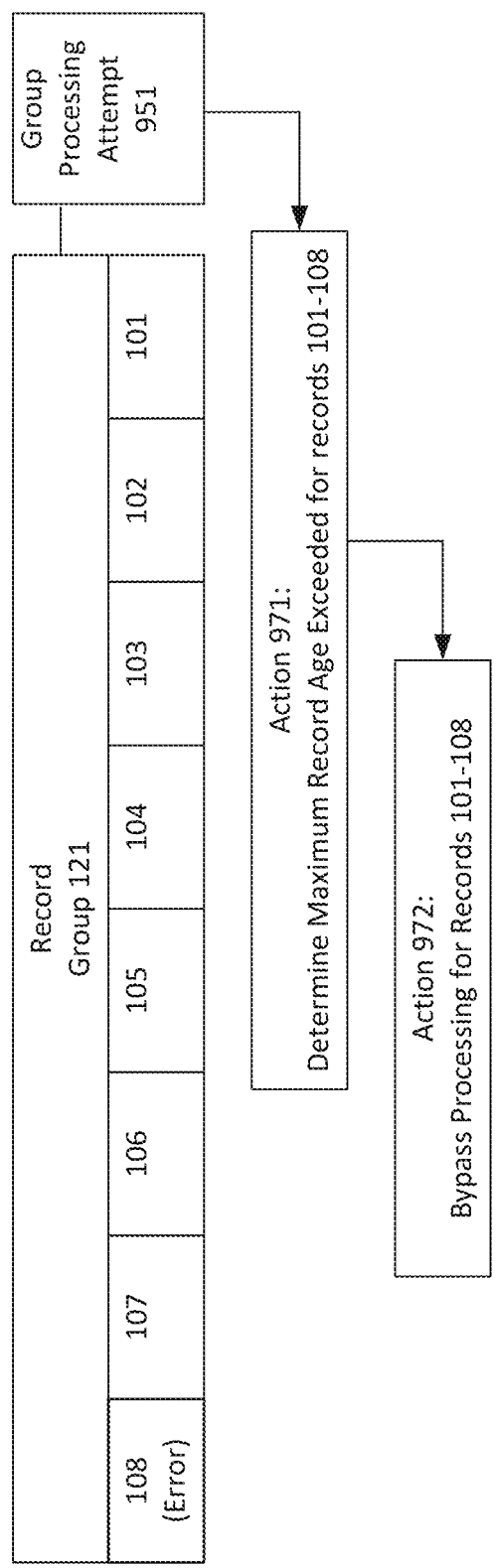
FIG. 9 is a diagram illustrating example record group processing based on the fourth example user interface configuration that may be used in accordance with the present disclosure.

Another feature that may be used to limit processing delays is the maximum record age feature. In the prior examples, the maximum record age was set to 200 seconds, as shown in input field 165 of FIGS. 1, 3 and 5. Also, in the prior examples, it is assumed that the maximum record age of 200 seconds was not exceeded for any of records 101-108. In some other examples, however, the maximum record age may be exceeded for one or more of the records that have not yet been successfully processed, and this may result in by passing of the processing of those records. Referring now to FIGS. 8 and 9, an example of the exceeding of the maximum record age will now be described in detail. In particular, FIG. 8 includes yet another configuration of user interface 160. Specifically, the user interface 160 of FIG. 8 is identical to user interface 160 of FIG. 5 with the exception that the maximum record age is reduced from 200 seconds to 35 seconds, as indicated by the value of 35 shown in input field 165. Referring now to FIG. 9, example record group processing based on the example user interface configuration of FIG. 8 will now be described in detail. As shown in FIG. 9, a group processing attempt 951 is performed on record group 121. During the performance of group processing attempt 951, records 101-107 are processed successfully with no errors. However, an error occurs during processing of record 108. Thus, group processing attempt 951 fails due to the error that occurs during processing of record 108. As shown in FIG. 8, a maximum of two retires may be performed when a group processing attempt fails. However, in the example of FIG. 9, prior to initiation of a retry attempt, a determination is made, at action box 971, that the maximum record age of records 101-108 has been exceeded. Thus, although up to two retries are available, the exceeding of the maximum record age overrides the available retry attempts and causes the processing of records 101-108 to be bypassed (as indicated at action box 972).

In some examples, the selection and configuration of the group-split feature, the number of groups feature, the maximum number of retry attempts feature, the maximum record age feature, the on-failure destination configuration feature, and/or other features may be enabled on a per-consumer (e.g., per-application) basis. Thus, for example, a user may choose to enable the group-split feature for one consumer application and to disable the group-split feature for another consumer application. As another example, a user may select a first value for the maximum retry attempt feature for one consumer application and may select a different value for the maximum retry attempt feature for another consumer application. As yet another example, a user may select a first value for the maximum record age feature for one consumer application and may select a different value for the maximum record age feature for another consumer application.

Figure 10:
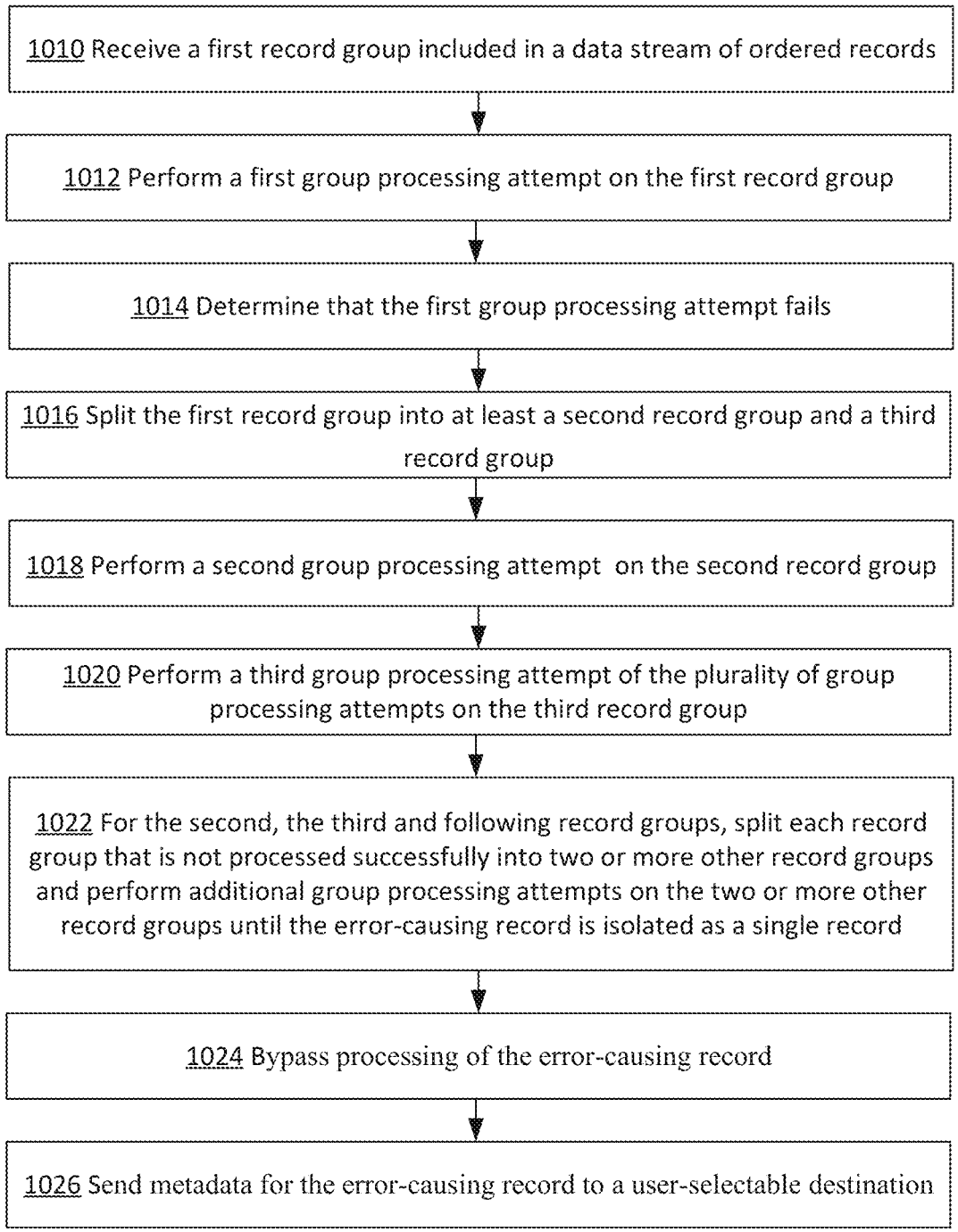
FIG. 10 is a flowchart illustrating an example process for error-causing record isolation that may be used in accordance with the present disclosure.

FIG. 10 is a flowchart illustrating an example process for error-causing record isolation that may be used in accordance with the present disclosure. The process of FIG. 10 is initiated at operation 1010, at which a first record group is received. For example, the record group may be received by a processing function, such as processing function 154 of FIG. 1. The first record group may be one of a plurality of record groups included in a data stream of ordered records.

Processing of the data stream may include a plurality of record group processing attempts, and each of the plurality of record group processing attempts may either succeed or fail. A success may occur when all records in an attempted record group are processed. By contrast, a failure may occur based on an error-causing record in the attempted record group.

At operation 1012, a first record group processing attempt of the plurality of record group processing attempts is performed on the first record group. For example, as shown in FIG. 2, record group 121 includes records 101-108. A group processing attempt 251 is performed on record group 121, for example by processing function 154 of FIG. 1. A record group processing attempt may be performed by attempting to process one or more of the records in the record group, in order, such as until an error occurs or all records in the record group are processed successfully. At operation 1014, it is determined that the first record group processing attempt fails. The first record processing attempt fails due to an error-causing record within the first record group that is not processed successfully. For example, as shown in FIG. 2, group processing attempt 251 fails due to an error caused by processing of record 108 (the error-causing record). In some examples, one or more components of data stream processing system 100 (e.g., grouping components 152, invoker 153, etc.) may receive an indication that the first record processing attempt has failed. However, the indication of the failure may not identify which specific record or records caused the failure.

At operation 1016, the first record group is split into at least a second record group and a third record group. In some examples, a user-configurable parameter may allow a user to select a quantity of record groups into which the first record group is split. For example, as shown in FIG. 1, input field 162 allows a user to select a quantity of groups into which to split a record group upon failure of a group processing attempt, and the user has selected two groups. In some examples, the first record group may be bisected into the second record group and the third record group. For example, as shown in FIG. 2, record group 121 is split into record group 122 (including records 101-104) and record group 123 (including records 105-108). When the first record group is bisected and the first record group includes an even number of records, the second and third record groups may include the same number of records. When the first record group is bisected and the first record group includes an odd number of records, the amounts of records in the second and third record groups may differ by one record. In some examples, the splitting of the first record group may be performed based on a user-configurable parameter (e.g., the group-split feature) that allows a user to decide whether record groups should be split based on failings of record group processing attempts. For example, checkbox 161 of user interface 160 of FIGS. 1, 3, 5 and 8 may allow a user to enable and/or disable the group-split feature.

In some examples, a user-configurable parameter (e.g., the maximum number of retry attempts feature) may allow a user to select a maximum number of record group processing retry attempts that limits how many times failed processing of a record group is reattempted. For example, input field 164 of user interface 160 of FIGS. 1, 3, 5 and 8 may allow a user to select a maximum number of record group processing retry attempts. In the examples of FIGS. 1 and 2, the maximum number of retry attempts is set to zero, and processing of record group 121 is not retried prior to splitting of the first record group. In some examples, however, the first record group processing attempt may be retried for the maximum number of record group processing retry attempts before the first record group is split. For example, as shown in FIG. 4B, processing of record group 121 (which initially fails in group processing attempt 451A) is retried once (via group processing attempt 451B) before record group 121 is split into record groups 122 and 123. The single retry of processing of record group 121 in FIG. 4B is based on the maximum number of retry attempts being set to one via input field 164 of user interface 160 of FIG. 3. As also described above, another user-configurable parameter (e.g., the maximum record age feature) may allow a user to select a maximum record age. Attempts to process record groups with records exceeding the maximum record age may be prohibited.

At operation 1018, a second record group processing attempt of the plurality of record group processing attempts is performed on the second record group. For example, as shown in FIG. 2, a group processing attempt 252 is performed on record group 122, for example by processing function 154 of FIG. 1. At operation 1020, a third record group processing attempt of the plurality of record group processing attempts is performed on the third record group. For example, as shown in FIG. 2, a group processing attempt 253 is performed on record group 123, for example by processing function 154 of FIG. 1.

At operation 1022, for the second, the third and following record groups, each record group that is not processed successfully is split into two or more other record groups and additional record group processing attempts of the plurality of record group processing attempts are performed on the two or more other record groups until the error-causing record is isolated as a single record. For example, as shown in FIG. 2, processing of record group 123 (e.g., the third record group) is not successful due to the inclusion of the error-causing record (record 108) in record group 123. Thus, record group 123 is split into record groups 124 and 125. Additionally, processing of record group 125 is not successful due to the inclusion of the error-causing record (record 108) in record group 125. Thus, record group 125 is split into record groups 126 and 127. As also shown in FIG. 2, record group 127 includes only the error-causing record (record 108) and no other records. Thus, the error-causing record (record 108) is isolated in record group 127. It is noted that, unlike record groups 123, 125 and 127 (which are not successfully processed due to record 108), other record groups that do not include record 108 (record groups 122, 124 and 126) are successfully processed and, therefore, are not split.

At operation 1024, processing of the error-causing record is bypassed after it is isolated as a single record. The term bypassing of processing, as used herein, means that no further attempts are made to process a record after a determination is made to bypass processing of the record. In some examples, after an error-causing record is isolated, processing of the error-causing record may be immediately bypassed and no further attempts may be made to process the record. In other examples, even after the error-causing record is isolated, one or more additional attempts may still be made to process the error-causing record before a determination is eventually made to bypass processing of the record. At operation 1026, metadata associated with the error-causing record is sent to a user-selectable destination. For example, as shown in FIG. 2, metadata for the error-causing record (record 108) may be sent to Destination XYZ, which is entered by the user via input field 163 user interface 160 of FIG. 1.

In some examples, in addition to the example parameters described above, other user-configurable parameters may also be employed to improve data stream processing efficiency in association with splitting of record groups. For example, in some cases, a user may be able to set one or more maximum thresholds that, when exceeded before completion of a record group processing attempt, may cause the current record group to be split into two or more smaller record groups. For example, a user may select a maximum threshold time period for a group processing attempt. In some cases, if a record group processing attempt that is currently being performed on a current record group is not completed within the threshold time period, then the current record group may be split into two or more smaller record groups. Group processing attempts may then be performed on the two or more smaller record groups. In addition to a threshold time period, other thresholds may also be employed, such as a threshold amount of processing resources that may be used by a group processing attempt, a threshold amount of memory resources that may be used by a group processing attempt, and others.

Figure 11:
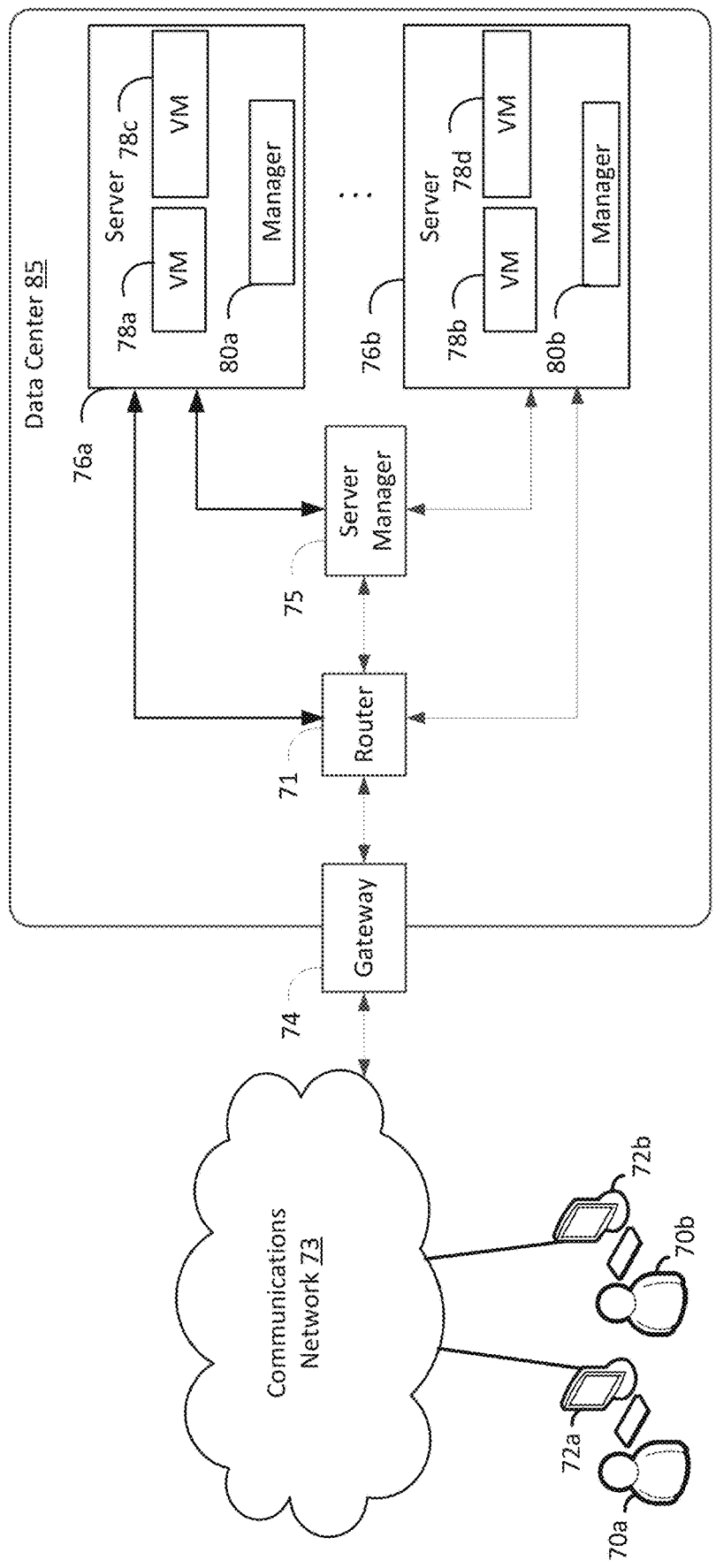
FIG. 11 is a diagram illustrating an example system for transmitting and providing data that may be used in accordance with the present disclosure.

An example system for transmitting and providing data will now be described in detail. In particular, FIG. 11 illustrates an example computing environment in which the embodiments described herein may be implemented. FIG. 11 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 11, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 11 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 11, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 11, a server manager 75 is also employed to at least in part direct various communications to, from and/or between servers 76*a* and 76*b*. While FIG. 11 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 11 has been greatly simplified and that many more networks and networking devices may be utilized to interconnect the various computing systems disclosed herein. These network topologies and devices should be apparent to those skilled in the art.

It should also be appreciated that data center 85 described in FIG. 11 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 12:
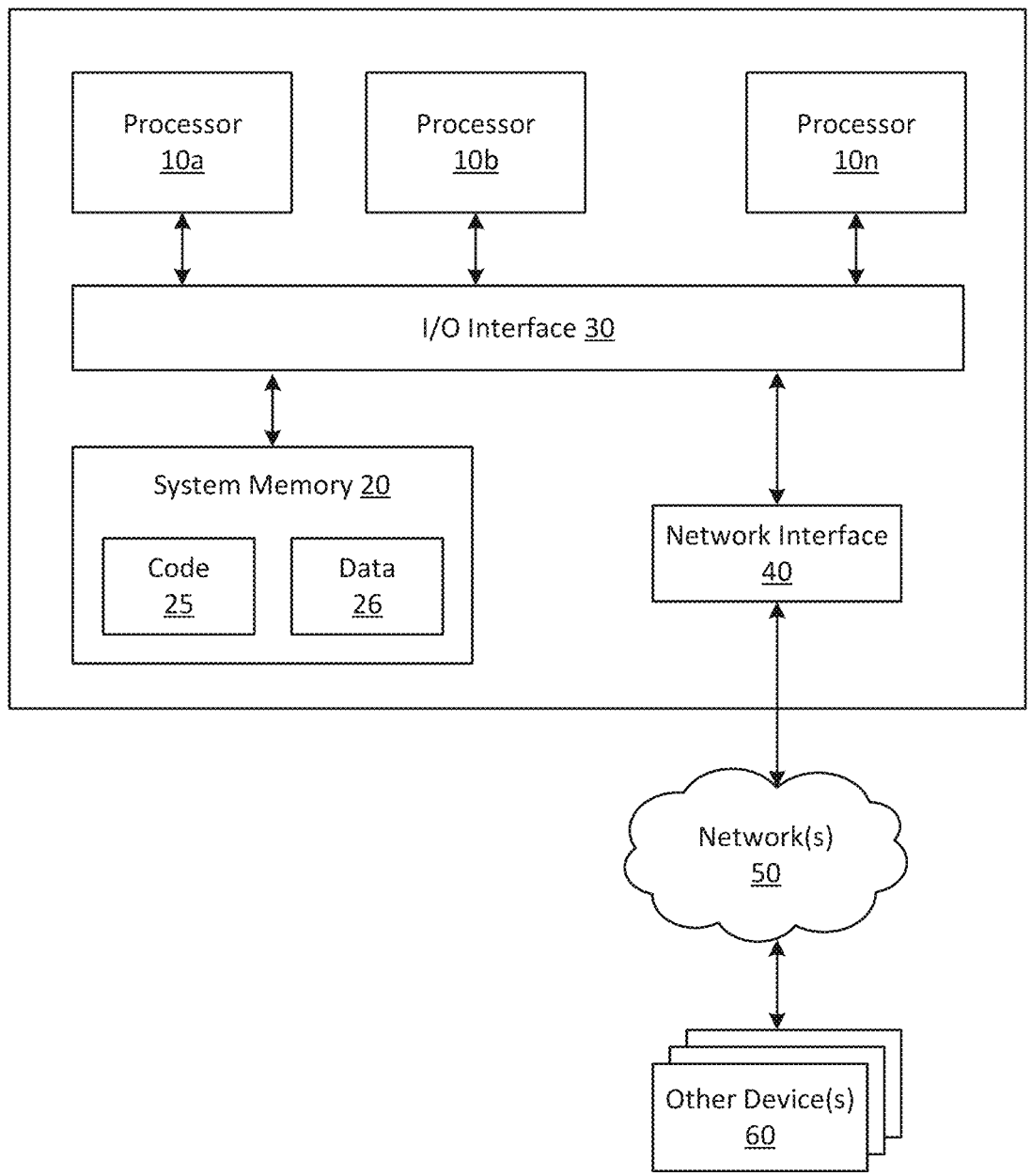
FIG. 12 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 12 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
   one or more processors; and
   one or more memories having stored therein computing instructions that, upon execution by the one or more processors, cause the computing system to perform operations comprising:
   receiving a first record group included in a data stream of ordered records, wherein processing of the data stream includes a plurality of group processing attempts, wherein each of the plurality of group processing attempts either succeeds or fails, wherein a success occurs when all records in an attempted record group are processed, and wherein a failure occurs based on an error-causing record in the attempted record group;

performing a first group processing attempt of the plurality of group processing attempts on the first record group;

determining that the first group processing attempt fails;

splitting the first record group into at least a second record group and a third record group, wherein the splitting of the first record group is performed based on a user-configurable parameter that allows a user to decide whether record groups should be split based on failings of group processing attempts;

performing a second group processing attempt of the plurality of group processing attempts on the second record group;

performing a third group processing attempt of the plurality of group processing attempts on the third record group; and for the second, the third and following record groups, splitting each record group that is not processed successfully into two or more other record groups and performing additional group processing attempts of the plurality of group processing attempts on the two or more other record groups until the error-causing record is isolated as a single record.

2. The computing system of claim 1, wherein the operations further comprise bypassing processing of the error-causing record after it is isolated as a single record.

3. The computing system of claim 1, wherein a user-configurable parameter allows a user to select a maximum number of record group processing retry attempts that limits how many times failed processing of a record group is reattempted.

4. The computing system of claim 3, wherein the first group processing attempt is retried for the maximum number of record group processing retry attempts before the first record group is split.

5. A computer-implemented method comprising:
receiving a first record group included in a data stream of ordered records, wherein processing of the data stream includes a plurality of group processing attempts, wherein each of the plurality of group processing attempts either succeeds or fails, wherein a success occurs when all records in an attempted record group are processed, and wherein a failure occurs based on an error-causing record in the attempted record group;

performing a first group processing attempt of the plurality of group processing attempts on the first record group;

determining that the first group processing attempt fails;

splitting the first record group into at least a second record group and a third record group;

performing a second group processing attempt of the plurality of group processing attempts on the second record group;

performing a third group processing attempt of the plurality of group processing attempts on the third record group; and for the second, the third and following record groups, splitting each record group that is not processed successfully into two or more other record groups and performing additional group processing attempts of the plurality of group processing attempts on the two or more other record groups until the error-causing record is isolated as a single record.

6. The computer-implemented method of claim 5, further comprising bypassing processing of the error-causing record after it is isolated as a single record.

7. The computer-implemented method of claim 5, wherein a user-configurable parameter allows a user to select a maximum number of record group processing retry attempts that limits how many times failed processing of a record group is reattempted.

8. The computer-implemented method of claim 7, wherein the first group processing attempt is retried for the maximum number of record group processing retry attempts before the first record group is split.

9. The computer-implemented method of claim 5, wherein a user-configurable parameter allows a user to select a maximum record age, and wherein attempts to process record groups with records exceeding the maximum record age are prohibited.

10. The computer-implemented method of claim 5, wherein the splitting of the first record group is performed based on a user-configurable parameter that allows a user to decide whether record groups should be split based on failings of group processing attempts.

11. The computer-implemented method of claim 5, wherein the first record group is bisected into the second record group and the third record group.

12. The computer-implemented method of claim 5, wherein a user-configurable parameter allows a user to select a quantity of record groups into which the first record group is split.

13. One or more non-transitory computer-readable storage media having stored thereon computing instructions that, upon execution by one or computing devices, cause the one or more computing devices to perform operations comprising:
receiving a first record group included in a data stream of ordered records, wherein processing of the data stream includes a plurality of group processing attempts, wherein each of the plurality of group processing attempts either succeeds or fails, wherein a success occurs when all records in an attempted record group are processed, and wherein a failure occurs based on an error-causing record in the attempted record group;

performing a first group processing attempt of the plurality of group processing attempts on the first record group;

determining that the first group processing attempt fails;

splitting the first record group into at least a second record group and a third record group;

performing a second group processing attempt of the plurality of group processing attempts on the second record group;

performing a third group processing attempt of the plurality of group processing attempts on the third record group; and for the second, the third and following record groups, splitting each record group that is not processed successfully into two or more other record groups and performing additional group processing attempts of the plurality of group processing attempts on the two or more other record groups until the error-causing record is isolated as a single record.

14. The one or more non-transitory computer-readable storage media of claim 13, wherein the operations further comprise bypassing processing of the error-causing record after it is isolated as a single record.

15. The one or more non-transitory computer-readable storage media of claim 13, wherein a user-configurable parameter allows a user to select a maximum number of record group processing retry attempts that limits how many times failed processing of a record group is reattempted.

16. The one or more non-transitory computer-readable storage media of claim 15, wherein the first group processing attempt is retried for the maximum number of record group processing retry attempts before the first record group is split.

17. The one or more non-transitory computer-readable storage media of claim 13, wherein a user-configurable parameter allows a user to select a maximum record age, and wherein attempts to process record groups with records exceeding the maximum record age are prohibited.

18. The one or more non-transitory computer-readable storage media of claim 13, wherein the splitting of the first record group is performed based on a user-configurable parameter that allows a user to decide whether record groups should be split based on failings of group processing attempts.

19. The one or more non-transitory computer-readable storage media of claim 13, wherein a user-configurable parameter allows a user to select a quantity of record groups into which the first record group is split.

20. The one or more non-transitory computer-readable storage media of claim 13, wherein the operations further comprise sending metadata for the error-causing record to a user-selectable destination.

\* \* \* \* \*